US012798777B2

(12) United States Patent
Robrecht

(10) Patent No.: US 12,798,777 B2
(45) Date of Patent: Nov. 17, 2026

(54) TILTABLE LOCK FITTING FOR CABIN EQUIPMENT

(71) Applicant: Airbus Operations GmbH, Hamburg (DE)

(72) Inventor: Volker Robrecht, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 86 days.

(21) Appl. No.: 19/070,072

(22) Filed: Mar. 4, 2025

(65) Prior Publication Data

US 2025/0282480 A1 Sep. 11, 2025

(30) Foreign Application Priority Data

Mar. 5, 2024 (EP) ..................................... 24161350

(51) Int. Cl.
*B64D 11/06* (2006.01)

(52) U.S. Cl.
CPC ................................ *B64D 11/0696* (2013.01)

(58) Field of Classification Search
CPC ............................ B64D 11/0696; B64D 11/00
USPC ...................................................... 248/503.1
See application file for complete search history.

(56) References Cited

U.S. PATENT DOCUMENTS 4,109,891 A * 8/1978 Grendahl .................. B64C 1/20
410/105
7,021,596 B2 4/2006 Lory
7,761,972 B2 7/2010 Laconte et al.
8,474,756 B2 7/2013 Allain et al.
8,668,181 B2 * 3/2014 Dazet .................... B60P 7/0807
248/500
9,902,498 B2 * 2/2018 Gensch .............. B60N 2/01575
11,926,420 B2 * 3/2024 Skelly ................ B64D 11/0023

OTHER PUBLICATIONS

European Search Report for corresponding European Patent Application No. 24161350 dated Aug. 12, 2024.

* cited by examiner

*Primary Examiner* — Anita M King

(74) *Attorney, Agent, or Firm* — Greer, Burns & Crain, Ltd.

(57) ABSTRACT

A fastening device for temporarily mounting equipment to a seat rail support, the fastening device comprises a bearing body, having a through hole in a longitudinal direction and a body contour in a cross-section transverse to the longitudinal direction and a pin, having a longitudinal rod portion with a first and second abutment portions at first and second ends. The rod portion is rotatably held in the through hole. The second abutment portion extends at least over an outer edge of the through hole. The first abutment portion has an outer shape in a cross-section transverse to the longitudinal direction of the rod portion, which cross section is inscribed in the body contour. The first abutment portion is rotatable by the pin from an aligned position, with the outer shape aligned with the body contour, to an extended position, with the first abutment portion laterally extending over the contour.

15 Claims, 3 Drawing Sheets

TILTABLE LOCK FITTING FOR CABIN EQUIPMENT

CROSS-REFERENCES TO RELATED APPLICATIONS

This application claims the benefit of European Patent Application Number 24161350.4 filed on Mar. 5, 2024, the entire disclosure of which is incorporated herein by way of reference.

FIELD OF THE INVENTION

The present invention relates to a fixing mechanism of cabin equipment to a seat rail support, and in particular to a fastening device for temporarily mounting equipment to a seat rail support, a fastening assembly, a fastening system, an aircraft and a method for providing the fastening device.

BACKGROUND OF THE INVENTION

In aircraft cabin spaces, cabin equipment may be mounted to longitudinally running seat rails at the cabin floor. A mounting portion of the cabin equipment may be received by a longitudinal groove of the seat rails to support the cabin equipment. Mounting the cabin equipment to corrosion-resistant seat rail designs without the groove may however be challenging.

SUMMARY OF THE INVENTION

There may thus be a need for a simpler and more reliable way of mounting cabin equipment to corrosion-resistant seat rail supports.

The object of the present invention is solved by one or more embodiments described herein. It should be noted that the following described aspects of the invention apply also for a fastening device for temporarily mounting equipment to the seat rail support, for the fastening assembly, for the fastening system, for the aircraft and for the method for providing the fastening device.

According to the present invention, a fastening device for temporarily mounting equipment to a seat rail support is provided. The device comprises a bearing body, having a through hole in a longitudinal direction, wherein the bearing body has a body contour in a cross-section transverse to the longitudinal direction and a pin member, having a longitudinal rod portion and a first abutment portion at a first end of the longitudinal rod portion and a second abutment portion at a second end of the longitudinal rod portion. The longitudinal rod portion is rotatably hold in the through hole of the bearing body. The second abutment portion is provided as an insert-stopping portion extending at least over an outer edge of the through hole. The first abutment portion has an outer shape in a cross-section transverse to the longitudinal direction of the longitudinal rod portion, which-cross section is inscribed in the body contour. The first abutment portion is rotatable by the pin member from an aligned position, in which the outer shape is aligned with the body contour, to an extended position, in which the first abutment portion laterally extends over the body contour.

As an advantage, the fastening device can be customized only via seat. As an advantage, there is no need of a provision on structure side by the airliner. As an advantage, the fastening device provides an installation of the seat interface from one side. As an advantage, the fastening device can be already attached to seat interface. As an advantage, the fastening device provides a visual indication of a locking position. As an advantage, seat rails can be provided from a simple web with fastening holes.

As an effect, the load is transfer is just by a pin.

As a further advantage, complexity of a fastening device is reduced.

According to an example, a lateral extension of the second abutment portion is provided as a lever element to apply the rotational movement. Preferably, the lever element and/or the first abutment portion are formed for being temporarily hold in a rotational position in which the first abutment portion is in the extended position.

According to an example, the bearing body is provided as a bushing. The bushing is configured to be inserted into a fastening hole of a fitting arrangement of the equipment and the seat rail support. The through hole is provided in the bearing body in an excentric manner, wherein a central axis of the through hole is provided displaced to a center axis of the body contour of the bearing body.

According to the present invention, also a fastening assembly for temporarily mounting equipment to a seat rail support is provided. The assembly comprises at least two fastening devices according to one of the previous examples and a common support plate. The at least two fastening devices are connected to the common support plate and longitudinal axes of the at least two fastening devices extend in a same perpendicular orientation from the common support plate.

As an advantage, multiple fastening devices support each other.

According to the present invention, also a fastening system for temporarily mounting equipment to a seat rail support. The system comprises a fixation apparatus comprising at least one fastening device according to one of the previous examples or a fastening assembly according to the previous example. The system also comprises an equipment mounting interface of an equipment. The equipment mounting interface has a web arrangement with at least one mounting web portion having at least one fastening hole and at least one rail segment of a seat rail support. The at least one rail segment has a vertically oriented rail web portion having at least one fastening through hole. The mounting web portion and the rail web portion are arranged adjacent such that the at least one fastening hole and the at least one fastening through hole are aligned and the fixation apparatus is extending through the fastening hole and the fastening through hole.

As an advantage, the fastening system withstands bending moment and forward loads. As an advantage, the fastening system provides the tilting resistance.

As an advantage, water cannot cumulate easily at the bottom of the at least one rail segment of the seat rail support. As an advantage, simple structural elements with a hole pattern are provided.

According to an example, the web arrangement comprises a flange portion configured for resting on an upper edge of the rail web portion.

According to the present invention, also an aircraft is provided. The aircraft comprises a fuselage structure enclosing a cabin space equipped with cabin equipment having at least one fastening system according to one of the previous examples. The cabin equipment is mounted to the fuselage structure via the at least one fastening system.

As an advantage, an aircraft is provided that can be adjusted to the passengers needs in short time. As an advantage, an aircraft is provided that enables removal of cabin equipment in short time to save weight. As an advantage, a corrosion-resistant aircraft is provided. As an advantage, any food stuff and drinks, e.g. coke, soft drinks can be served aboard the aircraft.

According to the present invention, also a method is provided for providing a fastening device for temporarily mounting equipment to a seat rail support. The method comprises the following steps:

Providing a bearing body, having a through hole in a longitudinal direction, wherein the bearing body has a body contour in a cross-section transverse to the longitudinal direction, and Providing a pin member, having a longitudinal rod portion and a first abutment portion at a first end of the longitudinal rod portion and a second abutment portion at a second end of the longitudinal rod portion. The longitudinal rod portion is rotatably hold in the through hole of the bearing body. The second abutment portion is provided as an insert-stopping portion extending at least over an outer edge of the through hole. The first abutment portion has an outer shape in a cross-section transverse to the longitudinal direction of the longitudinal rod portion, which-cross section is inscribed in the body contour and the first abutment portion is rotatable by the pin member from an aligned position, in which the outer shape is aligned with the body contour, to an extended position, in which the first abutment portion laterally extends over the body contour.

As an advantage, the fastening device can be provided at any fastening through hole to provide for a fastening system.

According to an aspect, a concept of a seat rail or seat interface resulting in a different seat rail profile containing a web/flange with a hole pattern for the seat fitting is provided. The seat rail or seat interface reduce accumulation of liquid within the seat rail to eliminate seat rail corrosion.

According to an aspect, a fastening set is provided. The fastening set comprises a sleeve that bears a bolt in its through hole. The bolt comprises a first protrusion at a first end of the sleeve. The shape of the first protrusion is formed to coincide with the cross-sectional shape of the sleeve at the first end in a primary setting. The fastening device can be inserted in a fixation hole in the primary setting with the first end ahead. While rotating the bolt in the sleeve, the first protrusion is brought to a secondary setting, where its shape intersects with the cross-sectional shape of the sleeve. Intersected material of the protrusion is engageable behind an area at the fixation hole. Consequently, the fastening set is blocked in the fixation hole and/or blocks components that form the fixation hole. Additionally, a second protrusion at the second end of the sleeve is provided. The second protrusion can also be brought to engagement with the fixation hole, while the first protrusion is brought to engagement with the fixation hole. This leads to a force between the first protrusion and the second protrusion holding the fastening set at the fixation hole.

According to an aspect, a lock fitting for cabin equipment at a rail support is provided.

According to an aspect, a tiltable lock fitting for cabin equipment is provided.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF THE PREFERRED EMBODIMENTS

Figure 1:
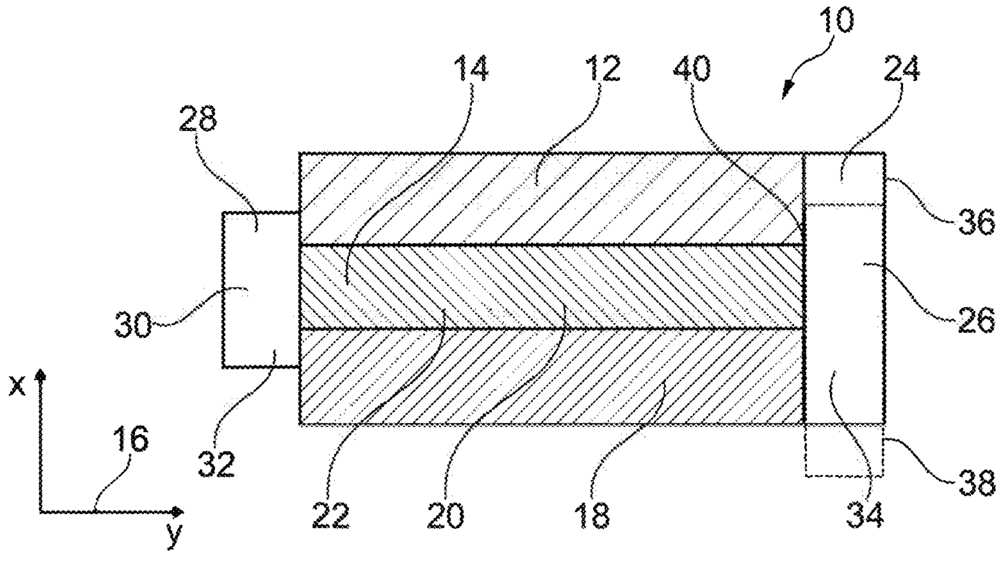
FIG. 1 schematically shows a general scheme of a cross section of an example of a fastening device.

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

FIG. 1 schematically shows a general scheme of a cross section an example of a fastening device 10. The fastening device 10 for temporarily mounting equipment to a seat rail support comprises a bearing body 12, having a through hole 14 in a longitudinal direction 16. The bearing body 12 has a body contour 18 in a cross-section transverse to the longitudinal direction 16 and a pin member 20, having a longitudinal rod portion 22 and a first abutment portion 24 at a first end 26 of the longitudinal rod portion 22 and a second abutment portion 28 at a second end 30 of the longitudinal rod portion 22. The longitudinal rod portion 22 is rotatably hold in the through hole 14 of the bearing body 12. The second abutment portion 28 is provided as an insert-stopping portion 32 extending at least over an outer edge of the through hole 14. The first abutment portion 24 has an outer shape 34 in a cross-section transverse to the longitudinal direction 16 of the longitudinal rod portion 22, which-cross section is inscribed in the body contour 18. The first abutment portion 24 is rotatable by the pin member 20 from an aligned position 36, in which the outer shape 34 is aligned with the body contour 18, to an extended position 38, in which the first abutment portion 24 laterally extends over the body contour 18.

The term "fastening device" can also be referred to as locking, engaging or latching device.

The term "temporarily mounting" relates to fixing the equipment to a seat rail support and to unmount it whenever it is desired to fix it again at another position of the seat rail or at the same position again.

The term "equipment" relates to cabin equipment, galley elements or monuments, seats, lavatories, shelves, trolley support storage spaces, trolleys, walls, toilet modules or the like. Basically, it relates to any object supporting the functioning of a cabin of a vehicle.

The term "seat rail support" relates to linear bar-like elements on a framework structure of a vehicle that can carry seats.

In an example, the seat rail support is a bar or a web, not shown in FIG. 1.

The term "cross-section" relates to a cut traverse to the longest extension of an object, where it describes a profile shape of the object, not shown in FIG. 1.

The term "bearing body" relates to a bearing or a support that is able to hold another object while allowing the object to move within the limits of the shape of the support.

The term "body contour" relates to an outline of a profile of an object, not shown in FIG. 1.

In an example, the body contour 18 of the bearing body 12 comprises a circular shape, not shown in FIG. 1.

In an example, the body contour 18 of the bearing body 12 comprises a cornered shape, not shown in FIG. 1.

In an example, the body contour 18 of the bearing body 12 comprises a triangular shape, not shown in FIG. 1.

In an example, the body contour 18 of the bearing body 12 comprises a rectangular shape, not shown in FIG. 1.

In an example, the body contour 18 of the bearing body 12 comprises an elliptical shape, not shown in FIG. 1.

In an example, the bearing body 12 comprises additional holes or recesses to save weight, not shown in FIG. 1.

The term "pin member" relates to a bar, column, post, nail, screw, rivet, strut.

The term "abutment portion" relates to projections extending from the surface profile of the pin member 20 that can engage behind, i.e., an entry side or an exit site of a through hole 14 or the entry and exit site of a fixation hole, not shown in FIG. 1, and can only be inserted in the fastening through hole 14 in a specific orientation. The "abutment portions" are configured to block the pin member 20 from being drawn out from the through hole 14 and the fixation hole, not shown in FIG. 1.

The term "rotatably hold" relates to the condition of the pin member 20 being surrounded by the through hole 14, where the through hole 14 restricts the movement of the pin member 20 to a rotation of its longest axis, i.e., the insertion direction of the pin member in the through hole 14 of the bearing body 12, as shown in FIG. 1.

The term "insert-stopping portion" relates to the function of the second abutment portion 28 in blocking the access of the second end 30 of the pin member 20 to the through hole 14.

In an example, in the latter manner, the insert stopping portion 32 also relates to the fastening device 10 being introduced to a fixation hole, not shown in FIG. 1. Here the fastening device 10 can be inserted in the fixation hole with the first abutment portion 24 ahead only, while the insert stopping portion 32 is larger than the fastening device 10 and the fixation hole.

In an example, the second abutment portion 28 abuts the circular area surrounding the entry site of a fastening hole, as shown in FIG. 1.

The term "inscribed" describes the relationship between to geometrical shapes that overlap, but where their outlines do not cross each other, such that one geometrical shape encloses the other geometrical shape, as shown in FIG. 1.

The term "aligned position" relates to the first abutment portion 24 being comprised within an outline of a longitudinal projection of the through hole 14 of the bearing body 12, as shown in FIG. 1.

The term "extended position" relates to the first abutment portion 24 intersecting the outline of the longitudinal projection of the through hole 14 of the bearing body 12, as shown in FIG. 1. The first abutment portion 24 is lurking out from the cross section of the main body of the bearing body 12 in a setting as such in the extended position 38, as shown in FIG. 1.

In an example, in the extended position 38 the bearing body 12 and the first abutment portion 24 provide a hook-like shape for engagement as provided by the extended position 38, as shown in FIG. 1.

In an example, this hook-like shape for engagement, as provided by the extended position 38, is formed to engage behind an exit area of a fixation hole, not shown in FIG. 1, when the fastening device 10 is inserted in the fixation hole.

In an example, the bearing body 12 is configured to be inserted into a latch recess of a seat rail support, e.g., formed as a mounting rail that overlaps with a latch recess of the equipment. The first abutment portion 24 is formed to engage behind the latch recesses to arrest the bearing body 12 at the latch recesses.

In an example of FIG. 1, the first abutment portion 24 is formed to laterally extend over the body contour 18 at least in the extended position 38 to exert a force on a latch arrangement 40 between the first abutment portion 24 and the second abutment portion 28 through the pin member 20.

The term "laterally extend" relates to the first abutment portion 24 protruding from the pin member 20 in a direction traversing a longitudinal direction 16 of the pin member 20.

The term "latch arrangement" relates to an orientation between the bearing body 12 and the pin member 20, where the first abutment portion 24 engages behind a first exit site of the through hole 14 of the bearing body 12 and the second abutment portion engages behind an entry site of the through hole 14 of the bearing body 12. In this manner the second abutment portion 28 secures the first abutment portion 24 against the bearing body 12, as shown in FIG. 1.

In an example, in the latch arrangement 40 the material of the longitudinal rod portion 22 is stretched, not shown in FIG. 1.

In an example, the force is potential energy, not shown in FIG. 1.

In an example, the force is frictional force, not shown in FIG. 1.

In an example, the force incudes a stretching of the material of the pin member 20, where preload energy is stored in the stretching, not shown in FIG. 1.

In an example not shown in FIG. 1, the second abutment portion 28 is configured to bring the first abutment portion 24 to the extended position 38 and to exert the force by a rotational movement smaller than 360°.

In an option of an example not shown in FIG. 1, preferably the rotational movement is equal to or smaller than 180°.

In an example, the rotational movement follows a plane traversing the longitudinal direction 16, not shown in FIG. 1.

In an example, the rotational movement is a tilting movement.

In an example, a tilting movement is applied on the second abutment portion 28 to bring the first abutment portion 24 to the extended position 38.

In an example, the rotational movement follows a plane perpendicular to the longitudinal direction 16, not shown in FIG. 1.

The term "rotational movement" relates to a change of the angular moment of the pin member 20 restricted by the through hole 14 of the bearing body 12, not shown in FIG. 1.

As an advantage, fast and simple installation of the fastening device is provided. As an advantage, fast and simple installation of the fastening device in restricted space such as gap in a floor support structure is provided.

Figure 2:
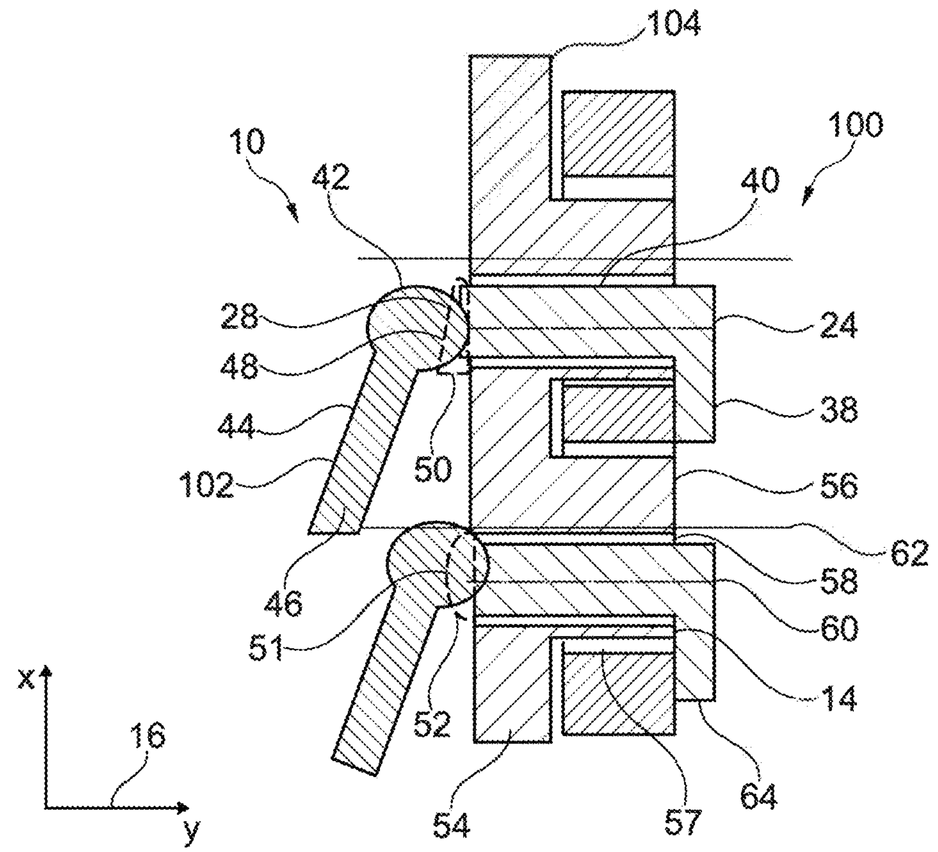
FIG. 2 schematically shows a general scheme of a cross section of an example of a fastening device and a fastening assembly.

FIG. 2 schematically shows a general scheme of a cross section of an example of a fastening device 10. A lateral extension 42 of the second abutment portion 28 of the fastening device 10 is provided as a lever element 44 to apply the rotational movement.

In an option of an example of FIG. 1, preferably the lever element 44 and/or the first abutment portion 24 are formed for being temporarily hold in a rotational position 46 in which the first abutment portion 24 is in the extended position 38.

The term "lever element" relates to an actuation portion, like, i.e. a handle.

In an example, the lever element 44 is connected via a tool interface to the second abutment portion 28, i.e., the pin member 20, such that it can be unmounted reversibly, not shown in FIG. 2.

The term "hold in a rotational position" relates to the lever element 44 additionally acting on the first abutment portion 24 to arrest, stop by, conserve, reserve its extended position 38, as shown in FIG. 2.

In an example, the lever element 44 is formed to be engage sideways in a floor support structure in order to fixate an arm of the lever element 44 in an arresting position, not shown in FIG. 2.

In an example, the lever element 44 can be that long that it will be above a floor level in open position and by rotating the lever element 44 and the locking disc, i.e., the second abutment portion 28 below the floor level, not shown in FIG. 2.

As an advantage, when the locking is finished a visual indicator by the down rotated lever element 44 ensures that the pin member 20 is properly locked.

In an example of FIG. 2, the lever element 44 has a clamping-force generating part 48. The clamping-force generating 48 part is arranged between the lever element 44 and the pin member 20 and formed to build-up a preload force by the rotational movement of the lever element 44 with respect to the bearing body 12.

The term "clamping-force generating part" relates to an object that is able to exploit the leverage effect of the lever element 44 in converting the movement of the lever element 44 in a force and directing the force towards the first abutment portion 24, along the longitudinal rod portion 22 of the pin member 20, not shown in FIG. 2.

The term "preload force" relates to potential mechanical energy stored in the material of the fastening device 10.

As an advantage, the extended position of the first abutment portion 24 can be secured more safely. As an advantage, equipment is secured more safely to a seat rail support.

In an example of FIG. 2, the clamping-force-generating part is provided as a wedge element 50, the wedge element 50 being configured to increase a distance between a leverage point of the lever element 44 and the first abutment portion 24, while an attacking portion 51 of the lever element 44 is shiftable on the wedge, when the lever element 44 is pulled and/or the clamping-force-generating part is provided as a cam element 52, the cam element being configured to increase the distance of the leverage point of the lever element 44 and the first abutment portion 24, while the attacking portion 51 of the lever element 44 is shiftable to the apex of the cam, when the lever element 44 is pulled.

The term "wedge element" relates to an object with a gradient in material thickness that can be used to support the attacking portion 51 of the lever element 44, which attacking portion 51 is arranged between the lever element 44 and the wedge element 50. When the lever element 44 is actuated its attacking portion 51 is shifted from a thinner material end of the wedge to a thicker material end of the wedge, as well as its leverage point does.

The term "cam element" relates to a cone-shaped object, where its rotational center is the thickest part, and the material thickness is decreasing in a radial gradient from the rotational center. When the lever element 44 is actuated its attacking portion 51 is shifted from an outer radius of the cam until the rotational center of the cam, as well as its leverage point does.

The term "attacking portion" relates to the part of the lever element 44 between the lever element 44 and the clamping-force generating part 48. The attacking portion 51 is directly interacting with the clamping-force generating part 48 as it abuts to it, as shown in FIG. 2.

The term "apex of the cam" relates to the thickest material part of the cam at its rotational center.

In an example, the wedge element 50 and the cam element 52 comprise an elastic material that is able to store the preload force, not shown in FIG. 2.

In an example, the connection between the lever element 44 and the pin member 20 is stretchable or flexible to store potential force, not shown in FIG. 2.

In an example, the wedge element 50 and the cam element 52 deform upon applying leverage force by the lever element 44, not shown in FIG. 2.

In an example, the lever element 44 can be pulled over 180 degree transverse to the rotational direction, as shown in FIG. 2.

In an example, a plurality of wedge elements and/or cam elements is provided.

As an advantage, a simple way of enhancing the securing force between the first and the second abutment portion 28 is provided. As an advantage, a simple way of steering the securing force between the first and the second abutment portion 28 is provided.

In an example of FIG. 2, a collar segment 54 is provided at one end of the bearing body 12. The collar segment 54 extends laterally from the bearing body 12 and the collar segment 54 is configured for abutting against the latch arrangement 40 and providing a bearing surface for the second abutment portion 28.

The term "collar segment" relates to a circular protrusion surrounding the second abutment portion 28 of the pin member 20, not shown in FIG. 2.

In an example, the collar segment 54 is formed as an equipment fitting portion.

In an example, the attacking portion 51 of the lever element 44 abuts the bearing surface of the collar segment 54.

In an example of FIG. 2, the bearing body 12 is provided as a bushing 56. The bushing 56 is configured to be inserted into a fastening hole 57 of a fitting arrangement of the equipment and the seat rail support. The through hole 14 is provided in the bearing body 12 in an excentric manner 58, wherein a central axis 60 of the through hole is provided displaced to a center axis 62 of the body contour of the bearing body 12.

The term "bushing" relates to a sleeve-like element that can take-up a rod-shaped element.

The term "excentric manner" relates to the longitudinal direction 16 of the through hole 14 being ex center from the central longitudinal axis of the bearing body 12, i.e. the bushing 56, as shown in FIG. 2.

In an example, the body contour 18 of the bushing 56 comprises a circular shape, not shown in FIG. 2.

In an example, the body contour 18 of the bushing 56 comprises a cornered shape, not shown in FIG. 2.

In an example, the body contour 18 of the bushing 56 comprises a triangular shape, not shown in FIG. 2.

In an example, the body contour 18 of the bushing 56 comprises a rectangular shape, not shown in FIG. 2.

In an example, the body contour 18 of the bushing 56 comprises an elliptical shape, not shown in FIG. 2.

In an example, the excentric distance is chosen to provide for the aligned position 36 and the extended position 38 of the second abutment portion 28 through the single rotational movement of the pin member 20 in the through hole 14, not shown in FIG. 2.

In an example, the longitudinal direction 16 of through hole 14 deviates from the central axis of the bearing body 12, to apply more force on the first abutment portion 24 by the second abutment portion 28 and to apply less force on a boundary region between the bearing body 12 fastening hole 57 of a fitting arrangement of the equipment and the seat rail support.

In an example, the through hole 14 follows the longitudinal direction 16 of bearing body 12 in a diagonal manner, not shown in FIG. 2.

In an example, the through hole 14 follows the longitudinal direction 16 of bearing body 12 in a diagonal manner and an excentric manner 58, not shown in FIG. 2.

In an example, the longitudinal axes of the second locking portion and the first guiding portion are parallel to the central axis of the fastening hole and the second locking portion, and the first guiding portion are insertable in the fastening hole in a form-fit manner as shown in FIG. 2.

As an advantage, a simple and robust way for bringing a locking element, e.g., the first abutment portion 24 into the extended position is provided.

In an example of FIG. 2, the first abutment portion 24 is formed as a disc 64.

In an example, the first abutment portion 24 of the pin member 20 is formed as a latching protrusion, as shown in FIG. 2.

In an example, the disc 64 comprises a friction material on a disc 64 surface facing and abutting to an exit area of a fastening hole, not shown in FIG. 2.

As an advantage, the first abutment portion 24 is insertable in the fastening hole, while providing most overlap when engaging behind the exit area of the fastening hole in an extended position. As an advantage, friction between the first abutment portion 24 and an exit area of a fastening hole is enhanced. As an advantage, the bushing or bearing body is not rotated in the fastening hole of a fitting arrangement of an equipment and a seat rail support, when a second abutment portion is brought to an extended position.

FIG. 2 schematically also shows a general scheme of a cross section of an example of a fastening assembly 100. The fastening assembly 100 for temporarily mounting equipment to a seat rail support comprises at least two fastening devices 102 according to one of the previous examples and options and a common support plate 104. The at least two fastening devices 102 are connected to the common support plate 104. Longitudinal axes of the at least two fastening devices 102 extend in a same perpendicular orientation from the common support plate 104.

In an example, the bearing body 12 portions are fixed to the common support plate 104, and the common support plate 104 is configured for abutting against a/the latch arrangement 40 and for providing a bearing surface for the second abutment portion 28.

Figure 3:
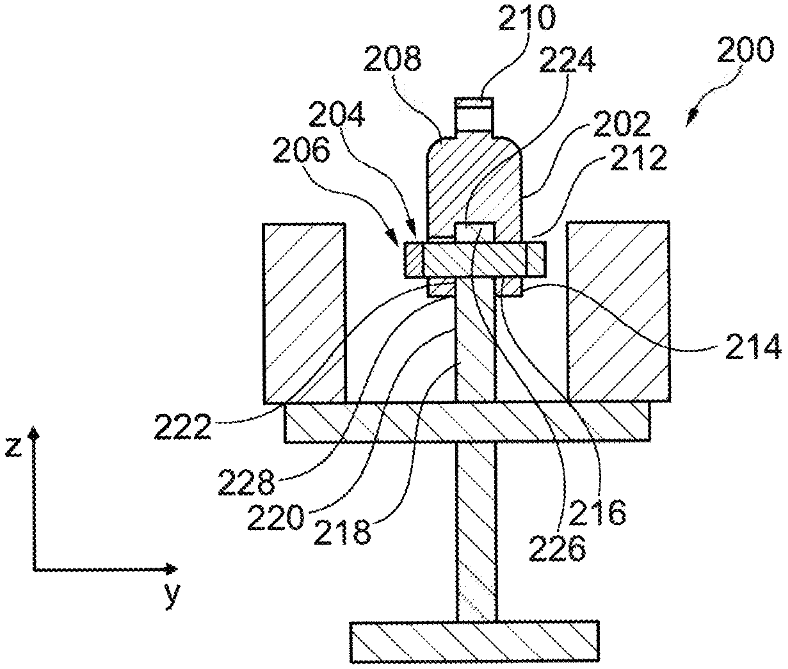
FIG. 3 schematically shows a general scheme of a cross section of an example of a fastening system.

FIG. 3 schematically shows a general scheme of a cross section of an example of a fastening system. The fastening system 200 for temporarily mounting equipment to a seat rail support comprises a fixation apparatus 202 comprising at least one fastening device 204 according to one of the previous examples and options or a fastening assembly 206 according to the previous example. The fastening system 200 also comprises an equipment mounting interface 208 of an equipment 210. The equipment mounting interface 208 has a web arrangement 212 with at least one mounting web portion 214 having at least one fastening hole 216. The fastening system 200 further comprises at least one rail segment 218 of a seat rail support, wherein the at least one rail segment 218 has a vertically oriented rail web portion 220 having at least one fastening through hole 222. The mounting web portion 214 and the rail web portion 220 are arranged adjacent such that the at least one fastening hole 216 and the at least one fastening through hole 222 are aligned and the fixation apparatus 202 is extending through the fastening hole 216 and the fastening through hole 222.

The term "equipment mounting interface" relates to a body portion or an area at the equipment itself that is formed to abut to a support, where it can be fastened to, as shown in FIG. 3.

The term "mounting web portion" relates to a longitudinal, plate-like abutment body, as shown in FIG. 3.

The term "rail segment" relates to a longitudinal bar or guiding, as shown in FIG. 3.

The term "rail web portion" relates to a longitudinal part of a seat rail that abuts to the mounting web portion 214, as shown in FIG. 3.

In an example, fixation of equipment on a standard hole pattern on a horizontal web of a seat rail which is extended here to a vertical hole pattern is provided.

In an example of FIG. 3, the web arrangement 212 comprises a flange portion 224 configured for resting on an upper edge 226 of the rail web portion 220.

The term "flange portion" relates to the highest part of a seat rail which is usually the part receiving most load from equipment 210 mounted on the seat rail.

As an effect a design and concept change can be provided.

As an advantage, an appropriate surface protection is easy to apply. As an advantage, constant corrosion is prevented as well as high in-service effort. As a further advantage, a change to a different material, e.g., titanium, which is very costly, due to the amount of seat rails in a cabin space, is not required. As an advantage, an easy to protect fastening system is provided. As an advantage, corrosion issues are avoided due to an open profile. As an advantage, a seat interface is provided with non-metallic sliding pad for upper surface of free vertical web of seat rail. As an advantage, corrosion risks are minimized as the fastening system reduces pooling possibilities, eases the application of surface protection and minimizes the abrasion by the seat stats on areas of the seat rail prone to corrosion.

In an example of FIG. 3, at least one mounting web portion 214 is formed as a fork-like engagement portion 228. The fork-like engagement portion 228 is configured to receive the upper edge 226 of the rail web portion 220. The at least one fastening hole 216 traverses the fork-like engagement portion 228 configured to align with the at least one fastening through hole 222 and the fixation apparatus 202 is extending through the fastening hole 216 and the fastening through hole 222. The fork-like engagement portion 228 is configured to transfer a preload force of the fixation apparatus 202 onto the rail web portion 220.

The term “fork-like engagement portion” relates to a bracket-or u-shaped profile of the equipment mounting interface 208 that comprises two bracket arms which embrace the vertically oriented rail web portion from the upper side. The two bracket arms can partly be contracted together by the fixation apparatus 202.

In an example, the fork-like engagement portion 228 has the same hole pattern and holes like the rail web portion.

As an advantage, the fork fitting improves the load transfer to the seat rail support.

Figure 4:
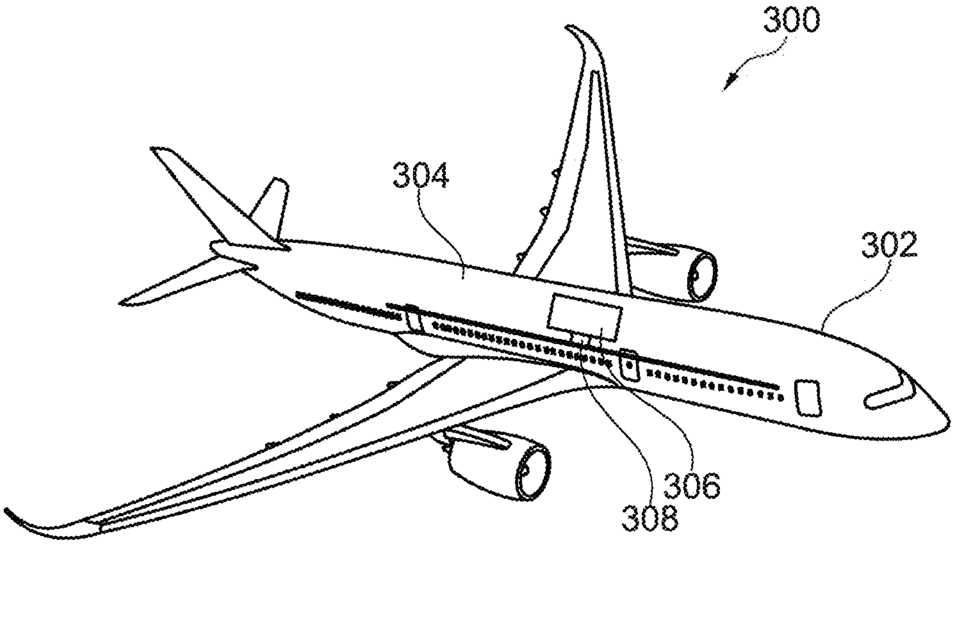
FIG. 4 schematically shows an aircraft comprising a fastening system.

FIG. 4 schematically shows an aircraft 300 comprising a fastening system 308. The aircraft 300 comprises a fuselage structure 302 enclosing a cabin space 304 equipped with cabin equipment 306 having at least one fastening system 308 according to one of the previous examples. The cabin equipment 306 is mounted to the fuselage structure 302 via the at least one fastening system 308.

In an example, a seat rail support is provided in the cabin space 304.

In an example, the at least one fastening system 308 is connected to the fuselage structure 302.

Figure 5:
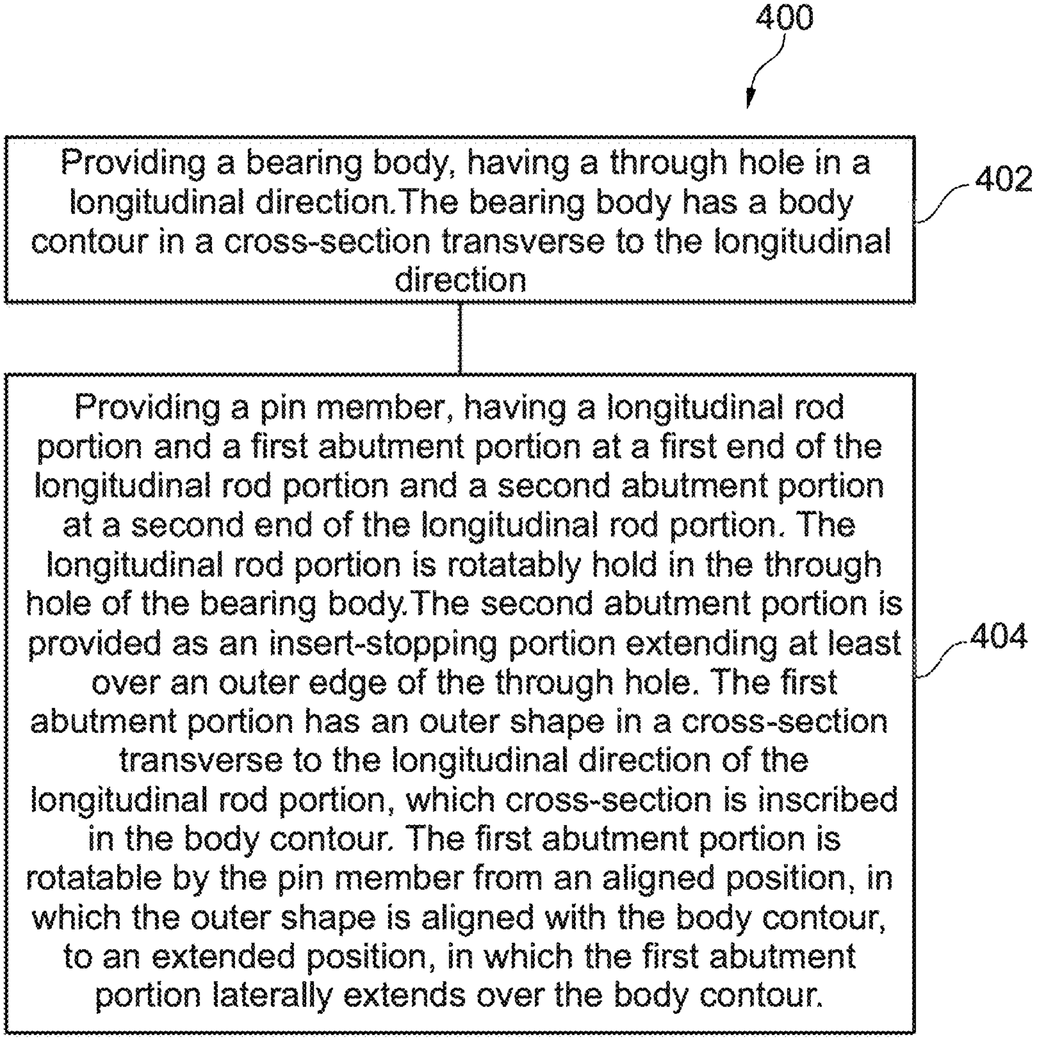
FIG. 5 shows basic steps of an example of a method for providing a fastening device.

FIG. 5 shows basic steps of an example of a method 400 for providing a fastening device 10. The method 400 comprises the following steps with reference to FIG. 1:

In a first step 402 a bearing body 12, having a through hole 14 in a longitudinal direction 16 is provided. The bearing body 12 has a body contour 18 in a cross-section transverse to the longitudinal direction 16.

In a second step 404 a pin member 20, having a longitudinal rod portion 22 and a first abutment portion 24 at a first end 26 of the longitudinal rod portion 22 and a second abutment portion 28 at a second end 30 of the longitudinal rod portion 22 is provided. The longitudinal rod portion 22 is rotatably hold in the through hole 14 of the bearing body 12. The second abutment portion 28 is provided as an insert-stopping portion 32 extending at least over an outer edge of the through hole 14. The first abutment portion 24 has an outer shape 34 in a cross-section transverse to the longitudinal direction 16 of the longitudinal rod portion 22, which-cross section is inscribed in the body contour 18. The first abutment portion 24 is rotatable by the pin member 20 from an aligned position 36, in which the outer shape 34 is aligned with the body contour 18, to an extended position 38, in which the first abutment portion 24 laterally extends over the body contour 18.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word “comprising” does not exclude other elements or steps, and the indefinite article “a” or “an” does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fastening device for temporarily mounting equipment to a seat rail support, the fastening device comprising:

a bearing body, having a through hole in a longitudinal direction, wherein the bearing body has a body contour in a cross-section transverse to the longitudinal direction; and a pin member, having a longitudinal rod portion and a first abutment portion at a first end of the longitudinal rod portion and a second abutment portion at a second end of the longitudinal rod portion;

wherein the longitudinal rod portion is rotatably held in the through hole of the bearing body;

wherein the second abutment portion is provided as an insert-stopping portion extending at least over an outer edge of the through hole;

wherein the first abutment portion has an outer shape in a cross-section transverse to the longitudinal direction of the longitudinal rod portion, which-cross section is inscribed in the body contour; and wherein the first abutment portion is rotatable by the pin member from an aligned position, in which the outer shape is aligned with the body contour, to an extended position, in which the first abutment portion laterally extends over the body contour.

2. The fastening device according to claim 1, wherein the first abutment portion is formed to laterally extend over the body contour at least in the extended position to exert a force on a latch arrangement between the first abutment portion and the second abutment portion through the pin member.

3. The fastening device according to claim 1, wherein the second abutment portion is configured to bring the first abutment portion to the extended position and to exert a force by a rotational movement smaller than 360°.

4. The fastening device according to claim 1, wherein a lateral extension of the second abutment portion is provided as a lever element to apply a rotational movement, and wherein the lever element, the first abutment portion, or both are formed for being temporarily hold in a rotational position in which the first abutment portion is in the extended position.

5. The fastening device according to claim 4, wherein the lever element has a clamping-force generating part, and wherein the clamping-force generating part is arranged between the lever element and the pin member and formed to build-up a preload force by the rotational movement of the lever element with respect to the bearing body.

6. The fastening device according to claim 5, wherein the clamping-force-generating part is provided as:

i) a wedge element, the wedge element being configured to increase a distance between a leverage point of the lever element and the first abutment portion, while an attacking portion of the lever element is shiftable on the wedge, when the lever element is pulled; or ii) a cam element, the cam element being configured to increase a distance of the leverage point of the lever element and the first abutment portion, while the attacking portion of the lever element is shiftable to a apex of the cam element, when the lever element is pulled; or, both i) and ii).

7. The fastening device according to claim 1, wherein a collar segment is provided at one end of the bearing body, wherein the collar segment extends laterally from the bearing body, and wherein the collar segment is configured for abutting against a latch arrangement for providing a bearing surface for the second abutment portion.

8. The fastening device according to claim 1, wherein the bearing body is provided as a bushing, wherein the bushing is configured to be inserted into a fastening hole of a fitting arrangement of the equipment and the seat rail support, wherein the through hole is provided in the bearing body in an excentric manner, wherein a central axis of the through hole is provided displaced to a center axis of the body contour of the bearing body.

9. The fastening device according to claim 1, wherein the first abutment portion is formed as a disc.

10. A fastening assembly for temporarily mounting equipment to a seat rail support, the assembly comprising:

at least two fastening devices according to claim 1; and a common support plate;

wherein the at least two fastening devices are connected to the common support plate, and wherein longitudinal axes of the at least two fastening devices extend in a same perpendicular orientation from the common support plate.

11. A fastening system for temporarily mounting equipment to a seat rail support, the system comprising:

a fixation apparatus comprising at least one fastening device according to claim 1;

an equipment mounting interface of an equipment, wherein the equipment mounting interface has a web arrangement with at least one mounting web portion having at least one fastening hole; and at least one rail segment of a seat rail support, wherein the at least one rail segment has a vertically oriented rail web portion having at least one fastening through hole; and wherein the mounting web portion and the rail web portion are arranged adjacent such that the at least one fastening hole and the at least one fastening through hole are aligned and the fixation apparatus is extending through the fastening hole and the fastening through hole.

12. The fastening system according to claim 11, wherein the web arrangement comprises a flange portion configured for resting on an upper edge of the rail web portion.

13. The fastening system according to claim 11, wherein at least one mounting web portion is formed as a fork-shaped engagement portion, wherein the fork-shaped engagement portion is configured to receive an upper edge of the rail web portion, wherein the at least one fastening hole traverses the fork-shaped engagement portion configured to align with the at least one fastening through hole and the fixation apparatus is extending through the fastening hole and the fastening through hole, and wherein the fork-shaped engagement portion is configured to transfer a preload force of the fixation apparatus onto the rail web portion.

14. An aircraft comprising:

a fuselage structure enclosing a cabin space equipped with a cabin equipment having at least one fastening system according to claim 11;

wherein the cabin equipment is mounted to the fuselage structure via the at least one fastening system.

15. A method for providing a fastening device for temporarily mounting equipment to a seat rail support, the method comprising the following steps:

providing a bearing body, having a through hole in a longitudinal direction, wherein the bearing body has a body contour in a cross-section transverse to the longitudinal direction; and providing a pin member, having a longitudinal rod portion and a first abutment portion at a first end of the longitudinal rod portion and a second abutment portion at a second end of the longitudinal rod portion, wherein the longitudinal rod portion is rotatably hold in the through hole of the bearing body, wherein the second abutment portion is provided as an insert-stopping portion extending at least over an outer edge of the through hole, wherein the first abutment portion has an outer shape in a cross-section transverse to the longitudinal direction of the longitudinal rod portion, which-cross section is inscribed in the body contour, and wherein the first abutment portion is rotatable by the pin member from an aligned position, in which the outer shape is aligned with the body contour, to an extended position, in which the first abutment portion laterally extends over the body contour.

* * * * *